STEP I — ADMIX A THERMOPLASTIC SYNTHETIC RESIN WITH 0.005 – 1.0% BY WEIGHT OF A BLOWING AGENT.

STEP II — HEAT ADMIXTURE TO A TEMPERATURE SUFFICIENT TO MELT THE RESIN AND UNDER A PRESSURE SUFFICIENT TO CAUSE THE RESIN TO FLOW, AND

STEP III — INJECT THE MELTED RESIN INTO MOLD CAVITY.

SAMUEL BAXTER  INVENTOR.

BY William F. Mufatti

ATTORNEY.

3,200,176
PROCESS FOR MOLDING THERMOPLASTIC RESIN ARTICLES FREE OF SURFACE DEFECTS
Samuel Baxter, Penhow, England, assignor to Monsanto Chemicals Limited, London, England, a British company
Filed Feb. 27, 1964, Ser. No. 347,701
Claims priority, application Great Britain, July 30, 1959, 26,129/59, Patent 944,611
7 Claims. (Cl. 264—54)

This application is a continuation-in-part of my copending application Serial No. 45,812, filed July 28, 1960 now abandoned.

This invention relates to a process for molding thermoplastic synthetic resin articles which are substantially free from surface voids and deformities commonly known as "sink mark."

Thermoplastic synthetic resins have been used for many years for the production of all kinds of articles, for their properties make them particularly suitable for shaping by various molding techniques such as those of injection molding and extrusion molding. However, it is a disadvantage attendant on their use that in certain circumstances the surfaces of moldings produced from them tend to contain "sink marks" (or depressions), particularly at the thickest parts of the moldings. Voids that in effect are analogous to sink marks are also sometimes formed. Such defects, which are particularly troublesome when a low molding pressure is used, are unsightly and reduce the strength of the finished moldings.

A simple and effective way of overcoming this difficulty has now been found.

FIG. 1 is a flow sheet of the process of this invention.

The process of the invention is one for the production of a molding from a thermoplastic synthetic resin, in which the tendency for the molding to contain a "sink mark" or void is substantially removed by the action of a blowing agent on the resin while it is being molded.

The blowing agent is a substance which on being heated in the molding operation produces several times its own volume of a gas or vapor. It is preferably a chemical blowing agent (often an organic substance) which yields a gas on thermal decomposition. In appropriate circumstances it can be a blowing agent which produces a vapor on heating, for example, a solid which gives a vapor or a liquid which volatilizes. Suitable chemical blowing agents include bicarbonates such as sodium bicarbonate and ammonium bicarbonate which yield carbon dioxide on decomposition, and organic blowing agents yielding nitrogen, such as those containing an N-nitroso-group, an azo-group, a diazo-group or a hydrazo-group. Examples of suitable blowing agents falling within the latter class are azodicarbonaminde, dinitrosopentamethylene tetramine, p,p'-oxy-bis(benzenesulphonyl)hydrazide, and benzene 1,3-disulphonyl hydrazide. An example of a volatile liquid that can be employed as a blowing agent is pentane or some other suitable liquid hydrocarbon.

Since it is an object of the invention to provide void-free moldings, the amount of blowing agent employed is, of course, very much less than would be employed in making a "foamed" resin. It is usually desirable to employ the blowing agent in such amount that the density of the finished molding is about 10% less than one made from the resin alone. The exact amount used varies with the particular blowing agent employed, the resin being molded, the type of molding desired, and the design and method of operation of the molding machine. For example, a blowing agent which produces relatively large amounts of gas or vapor on heating is used in smaller amounts than a blowing agent which produces smaller amounts of gas or vapor on heating, and, in the case of a particular blowing agent, larger amounts are usually required at lower molding pressures. Generally, the amount used in less than 1%, preferably less than 0.5%, by weight of the resin. Particularly satisfactory results are obtained when the blowing agent is used in amounts of 0.005–0.1%, preferably 0.01–0.05%, by weight of the resin.

Any of the thermoplastic synthetic resins used in injection molding can be employed in the practice of this invention. However, particularly suitable synthetic resins employed herein are the cellulose ethers and esters, e.g., ethyl cellulose, cellulose acetate, cellulose propionate, cellulose acetate butyrate; homopolymers and interpolymers of monomeric compounds containing the vinylidene group $CH_2=C<$ such as vinyl halides, e.g., vinyl chloride, vinyl bromide; vinylidene chloride; olefins, e.g., ethylene, propylene, isobutylene; vinyl esters of carboxylic acids, e.g., vinyl acetate, vinyl propionate, vinyl ethers, e.g., vinyl methyl ether, vinyl isobutyl ether; unsaturated carboxylic acids and derivatives thereof, e.g., acrylic acid, methacrylic acid, acrylic acid and methacrylic acid esters of alcohols containing 1–18 carbon atoms such as methyl and ethyl methacrylate, acrylamide methacrylamide methacrylonitrile, acrylonitrile; vinyl aromatic compounds, e.g., styrene, alpha-methylstyrene, vinyl toluene, p-ethylstyrene, 2,4-dimethylstyrene, o-chlorostyrene, 2,5-dichlorostyrene, etc. It is also feasible to employ the polyamide resins, e.g., caprolactam or derivatives of caprolactam which materials are commonly known by the generic name, nylon. It is feasible and in some cases desirable to employ blends of two or more thermoplastic materials such as blends of styrene polymers with rubbery diene polymers, such as natural rubber, butadiene-styrene interpolymers, butadiene-acrylonitrile interpolymers and the like. Styrene graft copolymers prepared by polymerizing monomeric styrene, either alone or in admixture with other vinylidene monomers such as acrylonitrile, in the presence of a rubbery diene polymer may also be employed advantageously. The preferred polymers are styrene homopolymers and interpolymers of styrene containing at least 50% and preferably at least 70% by weight of styrene and up to 50% and preferably up to 30% by weight of at least one vinylidene monomer interpolymerizable therewith, e.g., butadiene, acrylonitrile, alpha-methylstyrene and the like.

It is noted that in the process of this invention, the above-mentioned thermoplastic synthetic resins can be used with such ingredients as lubricants, fillers, colorants, antioxides, stabilizers and the like. These materials add certain beneficial qualities either to the process itself or to the finished article and are well-known in the commercial field.

The blowing agent can be included with the resin in various ways and in particular by coating the surface of the molding powder or granules or pellets with the blowing agents. In particular, this can be done by "tumbling" the molding powder or resin with the blowing agent to provide an intimate mixture thereof. Injection molding process for preparing the molded thermoplastic synthetic resin articles can be any of the high or low pressure injection molding processes. In general, the thermoplastic resin is rendered molten under a temperature sufficient to melt the resin and under a pressure sufficient to cause the resin to flow. The temperature to which the resin is heated is preferably in the range of 150–290° C. The pressure to which the resin is subjected is preferably in the range of 500–30,000 p.s.i.g. The molten resin is then injected into a mold cavity generally having a controlled mold cavity face temperature. This controlled temperature on the face of the mold cavity can vary from 20° C. to 120° C. Of course, if the temperature is not controlled or if control thereof is not desired, the temperature of the mold cavity face will eventually equilibrate with the temperature of the molten resin being injected therein. However, it is preferred to control the temperature of the mold cavity face.

The following examples are set forth to illustrate more clearly the principle and practice of this invention to those skilled in the art. Unless otherwise specified, where parts are mentioned, they are parts by weight.

*Example I*

This example describes the preparation of a molding composition that is a toughened polystyrene mixed with 0.01% by weight of a blowing agent, and its use in the preparation of moldings free from sink marks by an injection molding process.

2.27 grams of azodicarbonamide were added to 50 lbs. of toughened polystyrene pellets (actually cubes having sides approximately about 3/32 inch long), and the mixture was tumbled in a rotating drum for 20 minutes, at the end of which time it was found that the pellets were uniformly coated with the azodicarbonamide.

The treated pellets were then used to produce physical test pieces consisting of bars measuring 5 inches long by ½ inch wide by ¼ inch deep, using an injection molding machine operating at 13,000–15,000 lbs./sq. in. molding pressure, with a cylinder temperature of 225° C. and a mold temperature of 60° C. The injection time was 30 seconds, the cooling time was 15 seconds, and the dead time was 15 seconds. It was found that the surface of each test piece was smooth and free from sink marks.

For the purpose of comparison, similar test pieces were produced under identical conditions from untreated toughened polystyrene pellets, and it was found that very noticeable sink marks were present.

*Example II*

This example describes the preparation of a similar molding composition but containing 0.03% by weight of the blowing agent, and its use in the production of moldings free from sink marks by an extrusion-molding process.

6.81 grams of azodicarbonamide were added to 50 lbs. of toughened polystyrene pellets, and the mixture was tumbled in a rotating drum for 20 minutes, at the end of which time it was found that the pellets were uniformly coated with the azodicarbonamide.

The treated pellets were employed to produce a number of ladies' shoe heels each weighing 2 ozs., using an extrusion-molding machine operating at approximately 218° C. and a mold temperature of 20° C. The injection time was 4 seconds, and the cooling time was 1 minute and 40 seconds. It was found that the heels produced were free from sink marks.

For the purpose of comparison, a number of shoe heels were produced under identical conditions from toughened polystyrene pellets containing no azodicarbonamide. In every case it was found that the heels were unsuitable for use because of the presence of large voids and sink marks.

*Example III*

This example describes the production of moldings from a polyethylene containing 0.02% by weight of a blowing agent.

5.54 grams of azodicarbonamide were added to 50 lbs. of pellets (actually cubes having sides approximately 3/32 inch long) of a polyethylene which had a melt index of 7 and a density of 0.92. The mixture was tumbled in a rotating drum 20 minutes, at the end of which time it was found that the pellets were uniformly coated with the azodicarbonamide.

The treated pellets were then used to produce physical test pieces consisting of bars measuring 5 inches long by ½ inch wide by ¼ inch deep, using an injection molding machine operating at about 750 lbs./sq. in. molding pressure, with a cylinder temperature of 200° C. and a mold temperature of 60° C. The injection time was 30 seconds, the cooling time was 15 seconds, and the dead time was 15 seconds. It was found that the surface of each test piece was smooth and free from sink marks.

For the purpose of comparison, similar test pieces were produced under identical conditions from untreated polyethylene pellets, and it was found that noticeable sink marks were present.

The foregoing, particularly in the examples, is illustrative of the invention and not intended as a limitation thereof. It is obvious that many variations may be made in the products and processes set forth above without departing from the spirit and scope of this invention.

What is claimed is:

1. A process for preparing a molded thermoplastic synthetic resin article which is essentially free of surface voids and deformities which process comprises intimately admixing a thermoplastic synthetic resin with 0.005–1.0% by weight of a blowing agent based on the weight of the thermoplastic synthetic resin, heating the admixture to a temperature sufficient to melt the resin and under a pressure sufficient to cause the resin to flow and injecting the resin into a mold cavity.

2. The process of claim 1 wherein the resin is heated to a temperature of 150–290° C.

3. The process of claim 1 wherein the pressure is 500–30,000 p.s.i.g.

4. The process of claim 1 wherein the blowing agent is a thermally decomposable gas yielding chemical.

5. The process of claim 1 wherein the blowing agent is azeodicarbonamide.

6. The process of claim 1 wherein the thermoplastic synthetic resin is a homopolymer of styrene.

7. The process of claim 1 wherein the thermoplastic synthetic resin is a homopolymer of polyethylene.

References Cited by the Examiner

UNITED STATES PATENTS

| | | | |
|---|---|---|---|
| Re. 22,899 | 7/47 | Tucker | 264—329 |
| 1,370,805 | 3/21 | Flemming | 264—45 |
| 1,540,444 | 6/25 | Willis | 264—219 |
| 1,574,658 | 2/26 | Johnston | 264—54 XR |
| 2,901,446 | 8/59 | Hawkins | 260—2.5 |
| 2,912,391 | 11/59 | Hardy et al. | 260—2.5 |
| 3,058,161 | 10/62 | Beyer et al. | 264—47 |

OTHER REFERENCES

Delmonte, J.: Plastics in Engineering, First edition, Cleveland, Penton Publishing Co., 1940, pp. 552–4 (Machine Design Series).

Du Bois, J. H.: Plastics Mold Engineering, Chicago, American Technical Society, 1946, pp. 45–6.

ALEXANDER H. BRODMERKEL, *Primary Examiner.*